March 3, 1959 SHIH-YING LEE 2,875,782
VALVES AND METHOD OF MAKING SAME
Filed Dec. 24, 1953 5 Sheets-Sheet 1

INVENTOR.
SHIH-YING LEE
ATTORNEYS

Fig. 5

March 3, 1959 SHIH-YING LEE 2,875,782
VALVES AND METHOD OF MAKING SAME
Filed Dec. 24, 1953 5 Sheets-Sheet 3

INVENTOR.
SHIH-YING LEE
BY Kenway, Jenney, Witter
& Hildreth,
ATTORNEYS

March 3, 1959 SHIH-YING LEE 2,875,782
VALVES AND METHOD OF MAKING SAME
Filed Dec. 24, 1953 5 Sheets-Sheet 4

INVENTOR.
SHIH-YING LEE
BY Kenway, Jenney, Witter
Hildreth,
ATTORNEYS

March 3, 1959  SHIH-YING LEE  2,875,782
VALVES AND METHOD OF MAKING SAME
Filed Dec. 24, 1953  5 Sheets-Sheet 5

*INVENTOR.*
SHIH-YING LEE
BY Kenway, Jenney, Witter
 & Hildreth,
ATTORNEYS

United States Patent Office 2,875,782
Patented Mar. 3, 1959

2,875,782

VALVES AND METHOD OF MAKING SAME

Shih-Ying Lee, Watertown, Mass., assignor to Research Corporation, New York, N. Y., a corporation of New York Application December 24, 1953, Serial No. 400,170

13 Claims. (Cl. 137—622)

The present invention relates to control valves, and is concerned more particularly with multiple-port valves for the control of gaseous and liquid fluids under high pressure and where extremely accurate control characteristics are required.

There are numerous applications where multi-port flow control valves are employed. By way of illustration, many types of servo mechanisms make use of a control valve by which the flow of hydraulic fluid to a reversible hydraulic motor must be controlled with precision from a relatively low power level device, such as an electromagnetic actuator or torque motor. Commonly such hydraulic control valves are of the so-called four way type, employing an axially slidable valve spool operating within the valve body to admit hydraulic fluid to one side or the other of the hydraulic motor, and to permit discharge of fluid through the valve from the respective exhaust side of the motor.

For applications requiring precise control of high pressure fluid, conventional spool type control valves are difficult to construct with the required accuracy, and even if initially satisfactory, the precision cannot be maintained for any appreciable period of operation. For accurate control, the lands must be machined with exact relation to their cooperating shoulders, and the edges must be sharp. The abrading action of high pressure fluid, even when carefully filtered, is found to round off relatively quickly the sharp edges initially provided, so that the valve operation at small openings becomes erratic and non-linear.

It is therefore an object of the present invention to provide a flow control valve, well adapted for the precise control of high pressure fluids, both gaseous and liquid, wherein the cooperating flow-controlling elements may be fabricated with extremely high precision to provide a flow characteristic varying linearly with valve opening.

More specifically, it is an object of the invention to provide a valve construction wherein the critical flow-determining elements may be formed of hardened material and with accurately defined sharp edges, so as to provide and maintain for substantial periods of operation a linear flow characteristic as a function of valve opening, even for valve openings close to zero.

A further object of the invention is to provide a control valve construction applicable to valves of various types, including flat plate, axially slidable, and rotating valve embodiments, wherein the flow-controlling ports or orifices may be constructed with highly accurate relationship and with relative ease in manufacture.

It is also an object of the invention to provide a valve construction wherein the contact pressure between relatively movable abutting surfaces may be substantially minimized, so as to permit operation with high pressure gaseous fluids as well as liquid without appreciable dry friction, between the relatively movable parts.

Other objects and features will become apparent from the following description, taken in conjunction with the accompanying drawings, wherein.

Figures 1, 3:
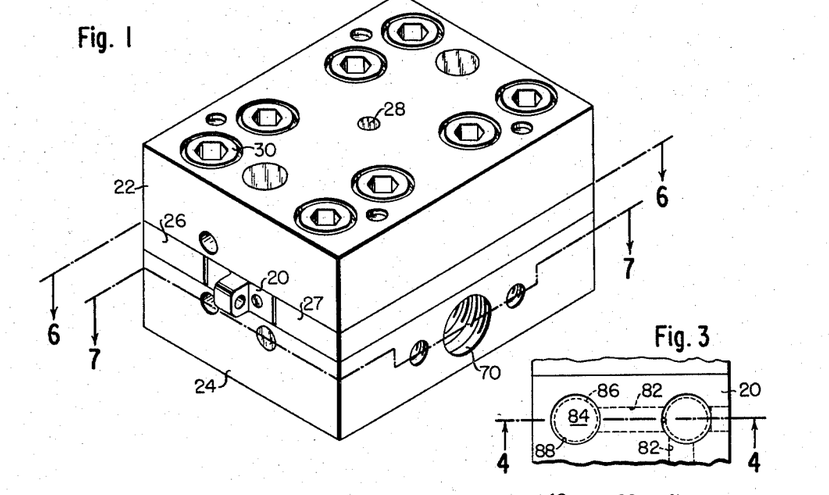
Fig. 1 is an isometric view of one form of valve constructed in accordance with the invention, and embodying a pivotally mounted movable control member.
Fig. 3 is a detail plan view showing a portion of the control member of the valve in the region of the balancing ports.
Figures 2, 4:
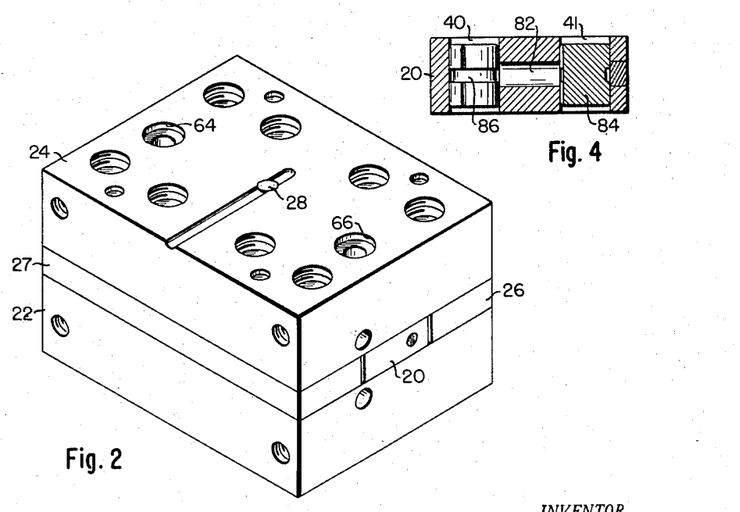
Fig. 2 is an isometric view showing the underside of the valve illustrated in Fig. 1.
Fig. 4 is a cross-section of the valve control member showing the construction of these balancing ports, taken on the line 4—4 of Fig. 3.
Figure 5:
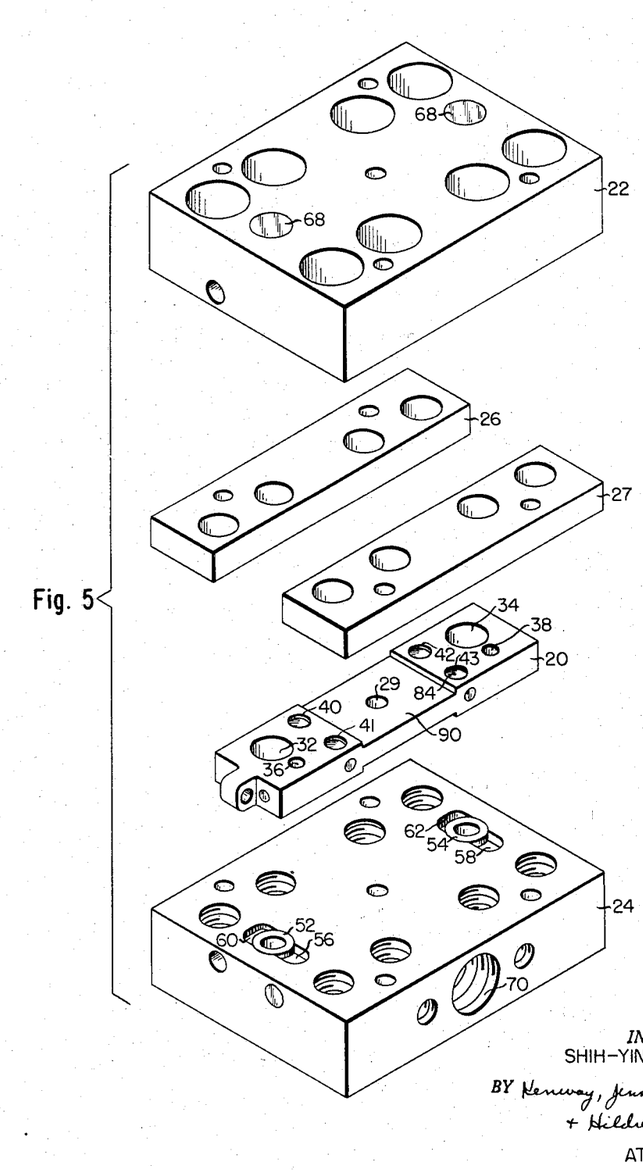
Fig. 5 is an exploded isometric view of the valve illustrated in Fig. 1 with the parts separated for clarity.
Figure 6:
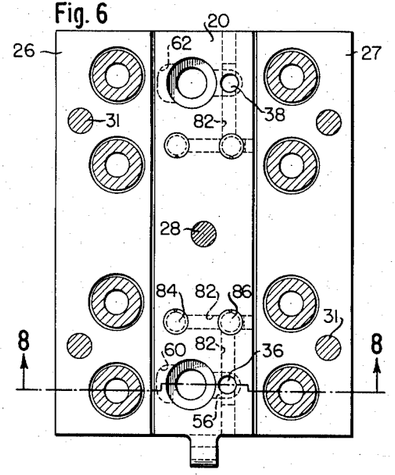
Fig. 6 is a sectional plan view of the valve taken on the line 6—6 of Fig. 1 and corresponding substantially to the appearance of the valve with the upper body portion removed.
Figure 7:
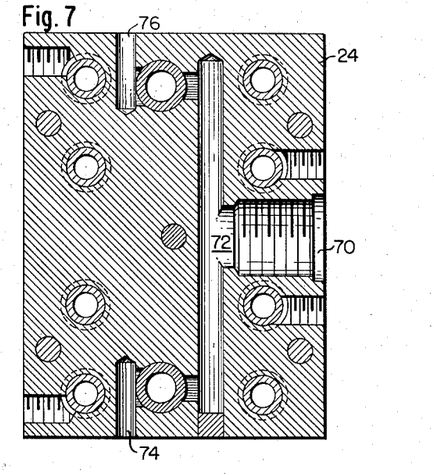
Fig. 7 is a sectional plan view through the lower body of the valve, taken along the line 7—7 of Fig. 1 and illustrating the arrangement of supply and exhaust passages.

In the embodiment illustrated generally in Figs. 1, 2 and 5, the valve comprises a member 20 in the form of a flat plate or bar mounted for limited rocking movement between upper and lower valve bodies 22 and 24. The parts 22 and 24 are separated by the spacers 26 and 27 which are slightly thicker than the movable valve member 20 to provide clearance. A pin 28 extending through the body and hole 29 in the valve member serves as a pivot point about which the member 20 can freely rock in either direction. As is shown in Fig. 6, sufficient lateral space is afforded between the valve member 20 and the spacers 26 and 27 to permit this rotation. Bolts 30 are employed to secure the valve bodies at the spacers, while registering pins 31 serve to maintain precise alignment of the parts.

The construction of the valve member 20 is illustrated in Figs. 5 and 6 in which the principal valve ports 32 and 34 are positioned to control the flow in accordance with the extent to which the member has been rocked from its neutral or no-flow position. Two additional ports 36 and 38, of similar diameter than the principal ports 32 and 34, extend through this moving member and are constantly in registration with the supply ports in the body of the valve, thus permitting the supply to feed into the valve orifices from both sides of the plate in a balanced flow pattern, thus eliminating the undesirable lateral pressure forces. Supplementary ports 40, 41, 42 and 43, are provided with pressure-equalizing means hereinafter described to aid in centering the valve member between the valve body members 22 and 24 in order that friction may be minimized and so that the valve will not tend to clamp or seize against one valve face or the other when gaseous or other non-lubricating fluids are employed. The operation of these balancing ports, analogous to the operation of pneumatic bearings, will be explained in greater detail hereafter, in conjunction with Figs. 3 and 4.

Figure 8:
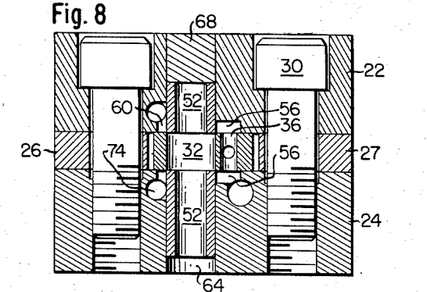
Fig. 8 is a sectional elevation through the valve at a control port, taken on a line corresponding to line 8—8 of Fig. 6 but including the upper valve body, illustrating the relationship of the valve parts in closed or no-flow position.

As has been indicated, the invention comprises a novel form of port construction for the flow-control orifices. This construction employs cylindrical sleeves or inserts disposed in the valve body in exact registration with the ports 32, 34 in the movable member when the latter is in center or neutral position. As illustrated in Figs. 6-10, these cylindrical inserts 52, 54 have substantially the same external diameter as the internal diameter of ports 32, 34 so as to close off the ports 32, 34 when the valve plate is positioned with the inserts and ports precisely coaxial (Fig. 8). Exact registration of inserts and ports in the neutral position is insured by drilling the holes for the ports and for the plugs, as well as for the pivot pin, when the valve body and the movable valve member are clamped together, as more fully described hereinafter.

Figure 9:
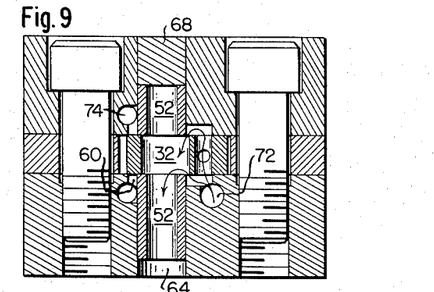
Fig. 9 is a sectional elevation at a control port as in Fig. 8 but showing the valve in open position for flow in one direction at the illustrated port.
Figure 10:
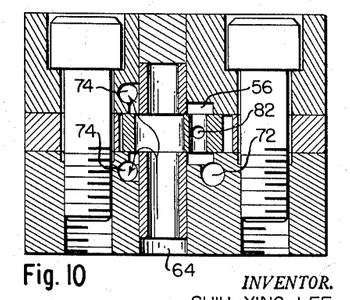
Fig. 10 is a sectional elevation similar to Fig. 8 but with the valve opened in the opposite direction for the flow of fluid in the reverse direction through the illustrated port.

When the valve member or plate 20 is rocked in either direction from its neutral position, the ports no longer register exactly with the cylindrical inserts, and orifices are created between the outer edge of the inserts and the inner edge of the port, as shown in the sectional views, Figs. 9 and 10. To provide flow communication with these valve orifices, the valve body is provided with chambers outwardly of the inserts, the chambers being milled in the valve bodies prior to insertion of the cylindrical ports 52, 54. The chambers 56 and 58 are in communication with the fluid supply while chambers 60, 62 lead to the exhaust. In the illustrative embodiment, the exhaust chambers 60, 62 are shown as somewhat wider than the supply chambers 56, 58, but this is not an essential feature.

Since the illustrative embodiment is a four-way valve, movement of the valve plate in one direction from neutral will result in flow of high pressure fluid to the load via one orifice, and exhaust of fluid from the load at the other orifice, while rocking movement of the valve in the other direction from neutral will reverse the flow. The passages by which appropriate flow communication is established to the load, such as a fluid motor or ram (not illustrated), comprise the central bores in the inserts 52, 54, which lead to the outside of the valve body on one face thereof (Fig. 2) where appropriate connection may be made to the load, either by suitable piping or preferably, as intended in the illustrative embodiment, by securing the valve body directly to the load with the ports 64, 66 in registry with the ports of the fluid motor or other load. Plugs 68 seal off the passages through the inserts in the other valve body 22.

The fluid supply, not shown, is connected to the valve body at 70 and is distributed through drilled passage 72 (Fig. 7) to the supply chambers 56, 58 adjacent the cylindrical inserts 52, 54. The exhaust ducts are provided by bores 74, 76 communicating with the chambers 60, 62 adjacent the other side of the inserts. In the illustrative embodiment, the exhaust ducts discharge outwardly of the valve body, an appropriate construction for applications where the valve may be enclosed within a suitable reservoir or sump to which the fluid is returned.

The paths which the high-pressure fluid takes for the different conditions of flow through the valve are best illustrated in Figs. 8 through 12. Figs. 8, 9 and 10 represent cross-sections taken through one of the valve ports, illustrating the three different valve positions. In Fig. 8, which is the illustration showing the position of the parts when no flow is taking place, the valve port 32 is shown in perfect registration with the cylindrical sleeve or inserts 52, thereby blocking communication at both the exhaust and the inlet passages 56 and 60, respectively. Minute movement of the valve member in either direction from this centered or neutral position, however, will result in flow either from the supply to the load, as illustrated in Fig. 9 by the arrows, or from the load to the exhaust ducts, as illustrated by the arrows in Fig. 10. It will be seen in Fig. 9 that the supplementary passages 36 in the valve member permit fluid flow from the inlet passage 72 to take place through the orifices on both sides of the valve member. While Figs. 9 and 10 may be considered as the same valve member in two different positions, they are equally illustrative of the flow conditions at opposite ends of the valve for the same position of the rotating plate, since whenever one valve port is operating to control the admission of fluid, the other is operating to permit exhaust from the load.

Figure 11:
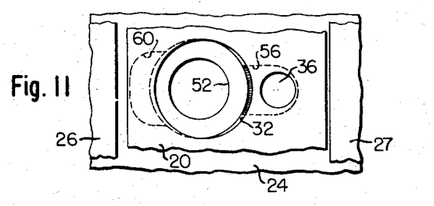
Fig. 11 is an enlarged detail in plan view of a portion of the movable valve control member and its cooperating port in the valve body, showing the relationship of the valve ports when the control member is moved to the right relative to the cylindrical insert in the body, said view corresponding to the position of the parts as shown in Fig. 9.
Figure 12:
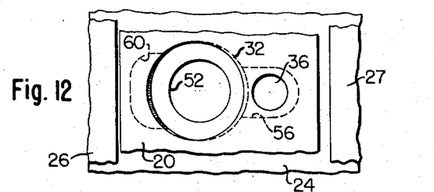
Fig. 12 is a similarly taken enlarged detail plan view, the position of the valve control member corresponding to the position of the parts shown in Fig. 10.

The valve openings which are illustrated in cross-section in Figs. 9 and 10 are seen in a plan view in Figs. 11 and 12. It will be seen that the supply and exhaust openings which are formed by motion of the valve plate on either side of the annular insert 52 are essentially narrow slits of uniform width, though curved. Under these conditions the area of the valve opening will be a linear function of slit width, corresponding to the displacement of the moving member from the neutral position.

It will be seen too that in this particular version of the valve the exhaust port formed by a given motion of the moving member is somewhat larger than the supply port formed under the same motion. This difference in area is advantageous in applications where the valve is being used to control the flow of compressed gases at very high pressures, where the increase in volume between the supply and exhaust sides of the load is considerable.

The auxiliary ports 40, 41, 42 and 43 in the valve plate 27 communicate with the high pressure supply through passages 82 extending from the side of the supplementary passages 36 and 38, as shown in Figs. 3 and 4. These ports are substantially but not entirely closed by plugs 84 having a circumferential channel 86 and secured by a force fit in the ports. These plugs terminate slightly below the surface of the valve plate to form shallow chambers. Each plug is provided with a longitudinal scratch or groove 88 in the side of the plug, the groove connecting with the circumferential channel 86. These scratches or minute grooves in the side of the plugs permit a very slight flow of fluid into the chambers at each end of the plugs. The scratches thus serve as tiny metering orifices, across which the pressure drop varies substantially with slight variations in flow.

In the operation of these balancing ports, when the valve member is substantially centered between the two halves of the valve body, the flow through the metering orifices of the balancing ports will be equal on both sides and the pressure in the shallow chambers will be the same. If, however, the valve member moves away from one side, the flow on that side through the metering orifices will increase, due to the increased clearance between valve member and body and the pressure drop through the orifice leading to that particular recess, or rather to all the recesses on that side, will increase. As a result, there will occur a reduction in the fluid pressure within the shallow chambers on that side of the valve member. At the same time, the pressure drop through the orifices on the other side will decrease and the pressure will build up in the recesses on that side, since the moving valve member has moved closer to the valve body on that side and thereby reduced the escape of fluid between member and body. This build-up of pressure will tend to restore the valve member to center position, with substantially equal clearance between each side of the movable member and the adjacent valve body. This automatic centering action is generally effective even in the absence of liquids to minimize metal to metal contact between the movable valve member and the valve body, with the result that the valve may be used to control high pressure gases, without requiring high power actuating means to overcome friction.

As has already been mentioned, a feature of the invention is the relative ease of manufacture of valves embodying the hole and sleeve form of control ports already described. In the fabrication of the valve of Figs. 1–12, the upper and lower valve bodies and the spacers are assembled and drilled for the registering pins and securing bolts. Then the parts are separated and the valve plate 20 is positioned in the cavity defined by valve bodies and spacers. At this stage of the fabrication, the valve plate is the same thickness as the spacers, so that upon tightening of the bolts, the valve plate is securely retained in clamped position. To insure centering of the plate between the spacers, suitable shims may be inserted on each side of the valve plate.

The assembly is now drilled, bored, and finish-lapped through upper valve body, valve plate, and lower valve body, to provide the center pivot hole and the two main ports. The parts are then disassembled and the valve plate 20 lapped to reduce its thickness very slightly relative to the spacers, sufficient to permit proper rocking movement between the valve bodies when clamped to the spacers. The central region of the plate 20 is preferably reduced in thickness at 90 to provide full clearance in the non-operating region. The chambers 56, 58, 60, 62 outwardly of the bores for the inserts are then milled in the valve bodies, after which the hardened inserts or bushings are pressed into place. The inserts must be slightly larger than the bores to provide a suitable press fit, resulting in a slight theoretical overlap between valve port and insert, but this geometrical overlap substantially compensates for the opposite effect resulting from the very slight working clearance between valve plate and valve body.

The result of this form of construction is to provide an extremely accurate relation of ports in the finished valve, while permitting sharply defined port edges of hardened material. It will be observed that the critical operations have involved simple drilling and lapping, with precise registry of the ports obtained by drilling through the valve parts in clamped assembly.

This novel and effective form of valve control orifice or port, with its relative ease of precise fabrication, is adaptable to valves of other forms and configurations.

Figure 13:
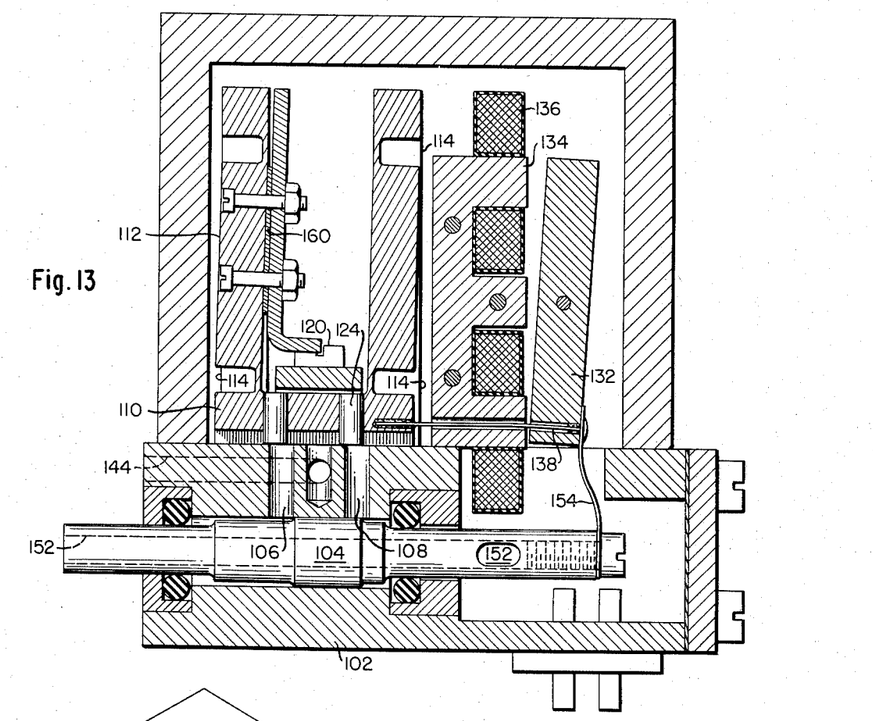
Fig. 13 is a sectional view showing an alternative embodiment of the invention wherein the movable valve element is supported by resilient connections of novel construction and arrangement, the valve having electromagnetic actuating means for the control member and also incorporating a fluid-powered ram under the control of the valve.
Figure 14:
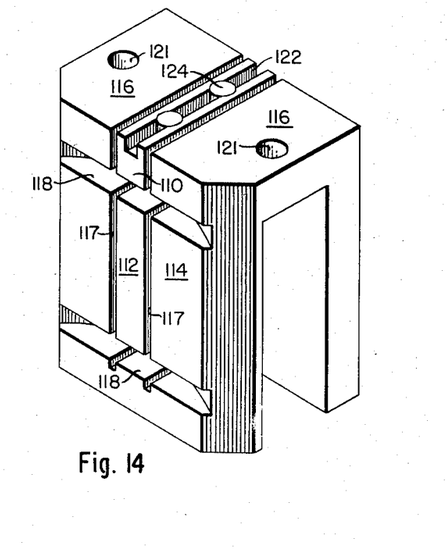
Fig. 14 is an isometric view illustrating in enlarged detail the sliding valve member of the embodiment of Fig. 13, showing the method of suspension and the underside of the valve with its flow-controlling ports and passages.

Figs. 13 and 14 illustrate a construction wherein the valve member is actuable in reciprocatory movement, a novel form of suspension being employed to provide the necessary slight clearance, as an alternative to the balanced arrangement previously described. In the illustrative embodiment of Fig. 13, a complete valve unit with electromagnetic actuator is disclosed, with the valve in control of a hydraulic ram, also illustrated. Such embodiment reveals the compact and effective arrangement made possible by control valves constructed in accordance with the invention.

The valve, like the construction previously described, employs circular ports and cooperating cylindrical plugs or inserts which register exactly when the valve is in closed position. The valve body 102, which also contains the piston 104 of the hydraulic ram, is provided with drilled ports 106, 108 which communicate directly with the ram chambers on each side of the piston.

The movable valve plate is indicated at 110, and is preferably formed integrally with its supporting arms 112, which in turn are integrally formed with the supports 114 and base 116. Parallel cuts 117 through this structure on each side of the valve plate 110 extend nearly to the top of the arms 112 to permit swinging movement of the valve plate and its supporting arms relative to the base 116. Fig. 14 shows an inverted view of this construction of valve plate and support. By milling transverse slots 118 in the arms 112, regions of reduced thickness in the arms 112 are provided which facilitate and localize the flexing. There is thus provided a rectilinear suspension system in which the valve plate may move in translation in a left and right direction as viewed in Fig. 13. By relieving the under surface of the valve plate 110 very slightly, as by lapping, the plate may be supported with the desired very slight clearance relative to the valve body, when the valve assembly is secured to the valve body by bolts 120 through holes 121.

The underside of the valve plate 110 is provided with a longitudinal groove 122 and cylindrical plugs 124, the plugs being in exact registry with the ports 106, 108 when the valve member is in neutral position. Such exact registry is readily obtained by drilling the valve plate and body simultaneously, with the parts secured together. Since the groove 122 is narrower than the diameter of the plugs 124, the orifice formed upon port opening is, as in the case of the first described embodiment, a narrow slit bounded by parallel sides and by similarly curved arcs. As a result, the port opening is a linear function of valve plate motion, even under conditions of very small openings, and consequently the valve provides a substantially linear flow characteristic, as with the first described embodiment.

In the apparatus shown in Fig. 13, the valve member 110 is arranged to be actuated by electromagnetic means, commonly termed a torque motor, comprising an armature 132 and pole pieces 134 carrying windings 136 adapted to be selectively energized from an amplifier or other source of control signal. A reed or wire 138 links the armature to the valve plate 110 to impart the required translational movements.

Under no-signal conditions, the valve plate is in neutral position with the plugs in exact registry with the ports to the ram cylinder, the valve suspension having sufficient stiffness to position the valve in neutral or off condition in the absence of any input signal to the torque motor windings. Under the influence of an input signal, the valve plate is urged in one direction or the other, depending on the phase or sign of the signal thereby uncovering the ports. Fig. 13 shows the valve plate displaced to the left, so as to admit fluid from the inlet passage 144 to the port 106 and thereby causing the ram to move to the right. Escape of fluid from the right hand ram chamber takes place through port 108 and thence to the interior of the casing 150, from which the fluid is discharged by way of a central passage 152 through the ram itself. By reason of the resilient feedback connection 154 between ram and armature, the ram is caused to take a position (displacement) as a function of input signal. A plate 160 secured in spaced relation to the inner face of one of the suspension arms 112 provides effective damping action of the valve suspension to minimize any tendency toward instability in valve response.

By reason of the substantially linear flow characteristics of the valve and the freedom from friction effects resulting from the valve suspension, the system is capable of utilizing very high fluid pressures to provide substantial output forces for small signal inputs to the torque motor. The assembly accordingly provides a highly compact electro-mechanical amplifier capable of function effectively in high gain servo systems having severe performance requirements.

Figure 18:
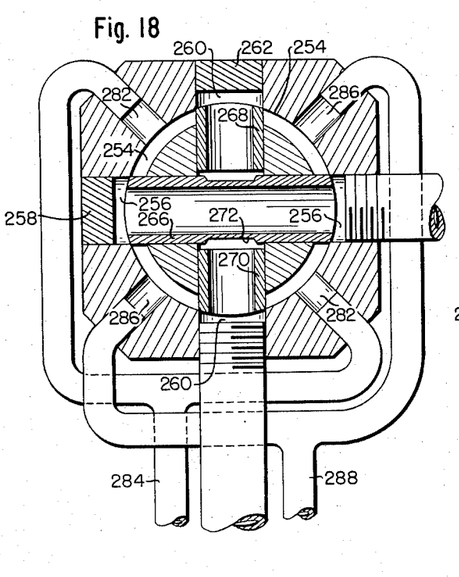
Fig. 18 is a sectional view showing still another embodiment of the invention wherein the novel port configuration of the invention is effectively employed in a cylindrical spool valve the actuation of which is by rotary motion.
Figure 19:
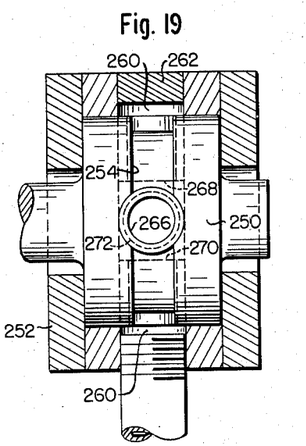
Fig. 19 is a view in elevation, partly in section, of the valve of Fig. 18.

The novel construction and arrangement of flow control orifice or port, as hereinbefore described, is well adapted for use in still other valve configurations. Thus, the construction may be embodied in an axially slidable spool type valve, as illustrated in Figs. 15, 16 and 17, or in a rotary cylindrical valve as shown in Figs. 18 and 19.

Figure 15:
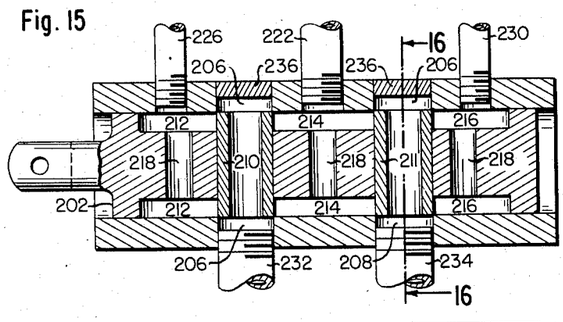
Fig. 15 is a sectional view showing a further alternative embodiment of the invention and illustrating the adaptation of the novel port construction to a valve of the axially slidable cylindrical spool type.
Figure 16:
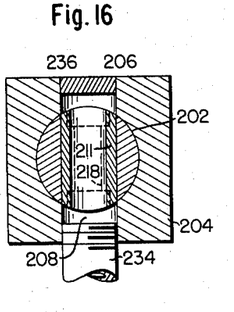
Fig. 16 is a sectional elevation taken on the line 16—16 of Fig. 15.
Figure 17:
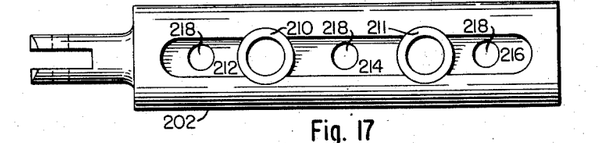
Fig. 17 is a top plan view of the movable valve member.

The valve configuration shown in Figs. 15-17 is somewhat similar to the conventional spool-type four way valve. Instead of employing the usual lands on the piston or spool, however, this valve makes use of the drilled ports, certain of which thereafter receive the cylindrical inserts which cooperate with the drilled ports to form the flow control orifices. In this embodiment, the movable valve member 202 is in the form of a piston which makes accurate sliding fit within the cylindrical bore in valve body 204.

The valve orifices are formed by assembling the movable member with the body, securing the parts in the desired position corresponding to no flow, and drilling the ports 206 and 208 diametrically through the valve body and piston 202. Before inserting the annular inserts 210, 211, in the holes in the piston, longitudinal slots are milled in the piston, narrower than the diameter of the inserts. When the inserts are pressed into the transverse bores in the piston, the slots are separated into chambers 212, 214 and 216. Passages 218 provide flow communication between the chambers on opposite sides of the piston, to permit flow to take place at both ends of the insert when the valve is opened and thereby equalize the lateral pressures on the piston.

The valve body is provided with appropriate passages for connection to the system, the valve chamber 214 having supply duct 222 and the chambers 212 and 216 having exhaust ducts 226 and 230. The connections 232 and 234 to the load (not illustrated) are made to the ports 206 and 208. Plugs 236 close off passages 206, 208 at the ends to which no external connections are made.

The operation of the valve in the control of fluid flow is similar to that in the case of the suspension valve described above. If the spool is moved to the left within the valve body, flow will take place frame the supply passage 222 and channel 214 through the parallel orifices created between the left hand insert 210 and the passage 206 in the valve body, and thence to the load by conduit 232, while the exhaust is via conduits 234, 230. If the valve spool is moved to the right from the zero or no-flow condition, flow takes place through the orifices at the right hand insert 211 and thence by passage 208 to the load, and from load to exhaust 226 by way of passage 206 and its orifice 210.

As in the previously described embodiments, the novel form and construction of flow controlling orifices makes it possible to provide an axially slidable valve resembling the conventional spool valve, but having the edges of the lands or valve orifices located with extreme accuracy, utilizing relatively simple operations for the valve manufacture.

In the conventional spool valve, it is well nigh impossible to construct a valve in which the lands are located on the valve spool with the accuracy required for control systems of high accuracy and sensitivity.

Another advantageous configuration embodying the novel port construction is shown in Figs. 18 and 19. In this valve the movable valve member 250 is in the form of a cylinder which is capable of rotating about its axis within the valve body 252. A circumferential groove 254 somewhat narrower than the diameters of the supply and exhaust ports is formed in the periphery of the cylindrical valve member. The supply port 256 is then drilled entirely through the valve body with the cylindrical valve member in the desired neutral or off position. The far end of this passage is then closed by plug 258. The diameter of the passage is somewhat greater than the width of the peripheral groove in the valve body. With the valve member still secured in the body, in exhaust port 260 is drilled into the valve body at right angles to the first passage 256 and similarly extending through into the valve body on the other side of the cylindrical valve member. Plug 262 closes the outer end of the said passage. The valve orifices are then formed in accordance with this invention by the insertion of the single long sleeve 266 and the two short sleeves 268 and 270. The sleeve 266 contains a groove or slot 272 cut in the outside of its circumference in order to provide communication between the sleeves 268, 270 around the full length insert 266.

When the valve is assembled, four annular passages or chambers are created by the milled slot 254 in the valve member 250 bounded by the cylindrical inserts and the valve body 252. Two of these passages lead through ports 282 and suitable conduits 284 to one side of the motor or load (not illustrated), while the other two ports 286 and conduit 288 lead to the other side of the load. If the cylindrical valve member is permitted to rotate clockwise from the zero or no-flow position shown, flow will take place from the supply port 256 around the edges at each end of the cylindrical insert 266 and into the passage created by the peripheral slot 254 in the valve member 250 and hence to the motor by passages 286 and conduit 288. At the other two orifices at the ends of inserts 268, 270, flow takes place from the exhaust side of the motor via conduit 284 and ports 282, and thence to the exhaust port 260.

It will be appreciated from the foregoing description that the invention provides a novel and effective form of port or orifice construction, whereby extremely precise flow control characteristics may be provided by utilizing relative simple constructions and arrangements which are readily realized in practical constructions. Not only may the fabrication of such valves be accomplished with very great precision, but the desirable flow characteristics may be retained over long periods of operation through the use of suitable wear resistant materials in the critical flow controlling elements.

While the invention has been illustrated and described as embodied in valves having zero lap, the methods and arrangements are equally well adapted to the provision of valves having precise amounts of under-lap or over-lap, as may be desired. For under-lap, where the flow is not to be completely reduced to zero, the diameter of the insert is slightly less than the diameter of the co-operating port. This is obtained by enlarging the port to the desired diameter by lapping or other precise method, after the aligned passages have been drilled to the diameter of the insert. Alternatively, the over-lap condition may be created by employing an insert of slightly larger diameter than the cooperating port, the bore for the insert being slightly enlarged, as by lapping, to receive the insert after the aligned passages have been drilled to the desired port diameter.

While the invention has been illustrated and described as embodied in valves of various configurations and constructions, it will be understood that the invention is not limited to such specific embodiments, but comprehends other forms and arrangements within the scope of the appended claims.

I claim as my invention:

1. In a valve having relatively movable valve members, valve passages in said members terminating in cooperating relation at an interface between relative sliding surfaces of the members, one of said passages being of circular centrally-open cross section, a circular insert in the other valve element opposite the open passage, said insert having an outside diameter substantially equal to the inside diameter of the centrally-open passage so that the periphery of the insert registers with the adjacent end of the passage to block flow communication past the periphery of the insert when the valve members are positioned with the passage and the insert in coaxial relation, and a chamber adjacent and bounded in part by the insert and terminating at the interface, the chamber being in flow communication with the centrally open passage when the insert and passage are out of coaxial relation.

2. A flow valve comprising a valve body and a movable valve element constrained to move in a predetermined path relative to said body, cooperating ports in valve body and movable element, said ports comprising circular bores in one of said valve members and circular inserts in the other of said valve members, the inserts having substantially the same outside diameter as the bores so as to block flow communication outwardly of the inserts when the movable valve member is positioned with the inserts coaxial with the circular ports, chambers in the valve body adjacent and bounded in part by the circular inserts, said chambers extending in the direction of movement of the valve element, said chambers being narrower than the diameter of the circular inserts and having sides aligned with the direction of movement of the valve element at the ports, whereby, upon displacement of the valve element from coaxial relation of circular bores and circular inserts the flow control orifices between bores and inserts are bounded by spaced arcs, the area of said orifices being substantially a linear function of the displacement of the movable element from zero-flow position.

3. A flow valve having members comprising a valve body and a movable valve element constrained to move in a predetermined path within said body, cooperating ports in valve body and movable element, the ports in the movable valve element extending through said movable element, said ports comprising bores in one of the valve members and circular inserts in the other of said valve members, chambers adjacent and bounded in part by the circular inserts said chambers having sides substantially parallel to the direction of movement of the movable valve element at the port, said chambers being narrower than the diameter of the inserts, whereby, upon displacement of the movable element from coaxial relation of bores and inserts, orifices having the configuration of a tuncated crescent are formed between the periphery of the inserts and the inside edges of the bores, the spacing between the arcs being substantially a linear function of the displacement of the movable valve element from zero flow position, and passages in the valve for causing the flow through the said orifices on opposite sides of the movable member to be in parallel.

4. In a valve having a valve body and a valve member movable relative thereto in a predetermined path, the valve body and movable valve member having interfacial surfaces in sliding close-fitting relation, valve passages in body and member terminating in cooperating relation at the interfacial surfaces, the passage in the valve member being of circular centrally open cross-section, an annular port element in the valve body, said element having an outside diameter equal to the inside diameter of the passage in the movable member, the passages in the valve body comprising a passage centrally of the annular port element and another passage outwardly of and adjacent the annular port element and bounded in part by said element, whereby flow communication between the central and outer passages in the valve is by the annular element prevented when the annular element and the passage in the movable member are in coaxial relation, and flow communication is established when the annular member and passage are out of coaxial relation.

5. A valve comprising spaced body portions, spacers between said body portions defining a chamber, means for securing the body portion and spacers, a movable valve element within said chamber intermediate the body portions, said valve element being positioned for movement relative to the body in a predetermined path, cooperating ports in the valve element and body portions, said ports comprising circular centrally-open passages in one of said valve members, circular inserts in the cooperating valve member, the outside diameter of said inserts corresponding to the diameter of the centrally open passages in the other member and said inserts and passages being in registry to block flow communication between the outside of the inserts and the interior of the passages when the inserts and passages are in coaxial relation, and chambers in the valve element adjacent and bounded in part by the circular inserts and in flow communication with the circular passages when the valve element is moved from coaxial relation of inserts and passages.

6. A valve comprising spaced body portions, spacers between said body portions defining a chamber, means for securing the body portions and spacers, a movable valve element within said chamber intermediate the body portions, said valve element being pivoted intermediate its ends for limited rocking movement in sliding relation to the body portions, cooperating ports in the valve element and valve bodies having their axes parallel to the pivotal axis of the movable valve element, said ports comprising circular bores in the valve element, cooperating aligned annular inserts in the valve bodies, said inserts having an outside diameter corresponding to the diameter of the ports in the movable valve element and said inserts and passages being in registry to block flow communication between the outside of the inserts and the interior of the passages when the inserts and passages are in coaxial relation, and chambers in the valve bodies adjacent and bounded in part by the annular inserts, said chambers being narrower than the outside diameter of the inserts so as to provide, when the valve element is moved from coaxial relation of inserts and passages, flow-controlling orifices bounded by parallel sides and spaced arcs to provide a substantially linear flow characteristic as a function of movement of the valve element.

7. A flow valve according to claim 1 wherein the circular inserts comprise circular plugs in the movable valve element, the plugs registering with and closing the bores in the other valve element when the plugs and bores are in coaxial relation, an open channel in the movable valve element extending longitudinally of the direction of movement of said valve element, said channel being narrower than the plugs and divided by said plugs into sections, whereby when the movable valve element is displaced from the zero-flow position flow-control orifices of arcuate configuration are formed between the periphery of the plugs and the edges of the adjacent bores thereby to establish flow communication between the sections of the channel and the bores in the valve body.

8. A flow control valve according to claim 1 wherein the valve body has a longitudinal passage within which the valve element is longitudinally displaceable, and longitudinal channels in the valve element intersected by the annular inserts said channels extending in the direction of valve movement and being narrower than the diameter of the inserts to provide, when the valve element is displaced from coaxial relation of inserts and bores, orifices bounded by straight sides and parallel arcs, and passages interconnecting the corresponding channels at each end of the inserts to equalize the pressures on opposite sides of the valve element.

9. A flow control valve according to claim 1 comprising spaced body portions and a circular valve element rotatable therebetween, cooperating ports in body and valve element disposed radially of the valve element, said ports comprising circular bores in the valve body, annular inserts in the circuit valve element flush with the periphery thereof, said annular inserts having an outside diameter corresponding to the diameter of the ports in the valve body, and a channel in the periphery of the circular valve element, said channel being narrower than the diameter of said inserts, and the inserts being centered in said channel in blocking relation thereto.

10. In a valve having relatively movable valve members, valve passages in said members terminating in cooperating relation at an interface between relative sliding surfaces of the members, one of said passages being of centrally-open cross section, an insert in the other valve element opposite the open passage, said insert having outside dimensions substantially equal to the inside dimensions of the centrally-open passage so that the periphery of the insert registers with the adjacent end of the passage when the valve members are positioned with the passage and the insert in coaxial relation, and a chamber adjacent and bounded in part by the insert and terminating at the interface, the chamber being in flow communication with the centrally open passage when the insert and passage are out of registry.

11. A flow valve comprising a valve body and a movable valve element, cooperating ports in body and movable element comprising aligned passages in the valve body and movable valve element, plugs in the passages in the movable valve element, the plugs registering with the passages in the valve body when the valve element is in zero-flow position, an open channel in the movable valve element extending longitudinally of the direction of movement of said valve element, said channel being narrower than the plugs and divided by said plugs into sections, whereby when the movable valve element is displaced from coaxial relation of plugs and passages flow-control orifices are formed between the periphery of the plugs and the edges of the adjacent passages thereby to establish flow communication between the sections of the channel and the passages in the valve body.

12. A valve comprising spaced body portions, spacers between said body portions defining a chamber, means for securing the body portions and spacers, a movable valve element within said chamber intermediate the body portions, said valve element being pivoted intermediate its ends for limited rocking movement in sliding relation to the body portions, cooperating portions in the valve element and valve bodies having their axes parallel to the pivotal axis of the movable valve element, said ports comprising circular bores in the valve element, cooperating aligned annular inserts in the valve bodies, said inserts having an outside diameter corresponding to the diameter of the ports in the movable valve element, and chambers in the valve bodies adjacent and bounded in part by the annular inserts, the chambers being disposed on each side of the insert in the direction of movement of the movable valve element, inlet and exhaust passages connected to said chambers, the chambers being narrower than the diameter of the inserts to provide when the valve element is moved in one direction from coaxial relation of bores and inserts, flow communication between the passage in the movable valve element and a pair of inlet chambers, and with a pair of exhaust chambers when the movable valve element is moved in the other direction.

13. A valve comprising spaced body portions, spacers between said body portions defining a chamber, means for securing the body portions and spacers, a movable valve element within said chamber intermediate the body portions, said valve element being pivoted intermediate its ends for limited rocking movement in sliding relation to the body portions, cooperating ports in the valve element and valve bodies having their axes parallel to the pivotal axis of the movable valve element, said ports comprising circular bores in the valve element, cooperating aligned annular inserts in the valve bodies, said inserts having an outside diameter corresponding to the diameter of the ports in the movable valve element, chambers in the valve bodies adjacent and bounded in part by the annular inserts, the chambers being disposed on each side of the insert in the direction of movement of the movable valve element, inlet and exhaust passages connected to said chambers, the chambers being narrower than the diameter of the inserts to provide when the valve element is moved in one direction from coaxial relation of bores and inserts, flow communication between the passage in the movable valve element and a pair of inlet chambers, and with a pair of exhaust chambers when the movable valve element is moved in the other direction, a supplementary passage within the movable valve element, and means providing restricted flow communication from said passage to both sides of the element at the interfaces between said element and the valve bodies to provide centering of the element between the bodies.

References Cited in the file of this patent

UNITED STATES PATENTS

| | | |
|---|---|---|
| 2,291,563 | Rotter | July 28, 1942 |
| 2,295,111 | Hemmings | Sept. 8, 1942 |
| 2,419,243 | Allen | Apr. 22, 1947 |
| 2,600,702 | Stephens | June 17, 1952 |
| 2,679,377 | Mueller | Mar. 25, 1954 |
| 2,710,628 | Hodgson | June 14, 1955 |

FOREIGN PATENTS

| | | |
|---|---|---|
| 537,715 | Great Britain | July 3, 1941 |

OTHER REFERENCES

Practical Designs for Drilling, Filling, and Tapping Tools, by C. W. Hinman, Second Edition, 1946, McGraw-Hill Book Company, Inc.

UNITED STATES PATENT OFFICE
CERTIFICATE OF CORRECTION

Patent No. 2,875,782                                    March 3, 1959

Shih-Ying Lee

It is hereby certified that error appears in the printed specification of the above numbered patent requiring correction and that the said Letters Patent should read as corrected below.

Column 10, line 8, strike out "prevented" and insert the same after "valve is" in line 7, same column; column 11, line 57, for "portions" read -- ports --.

Signed and sealed this 4th day of August 1959.

(SEAL)
Attest:

KARL H. AXLINE
Attesting Officer

ROBERT C. WATSON
Commissioner of Patents